Oct. 25, 1927. 1,647,104
H. A. DENMIRE
TIRE BUILDING MACHINE
Filed July 11, 1924 2 Sheets-Sheet 1
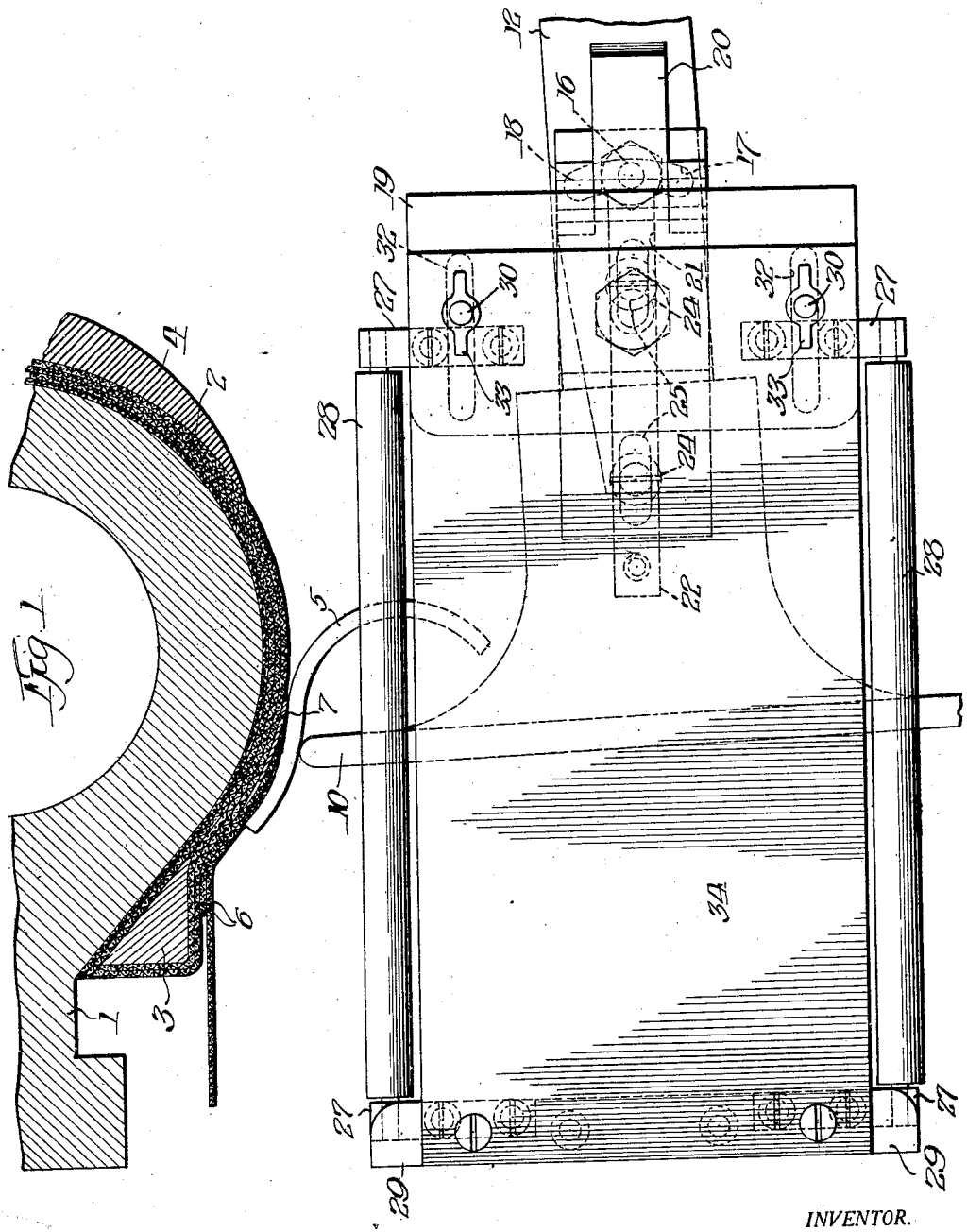
INVENTOR.
Harold A. Denmire,
BY
ATTORNEY.

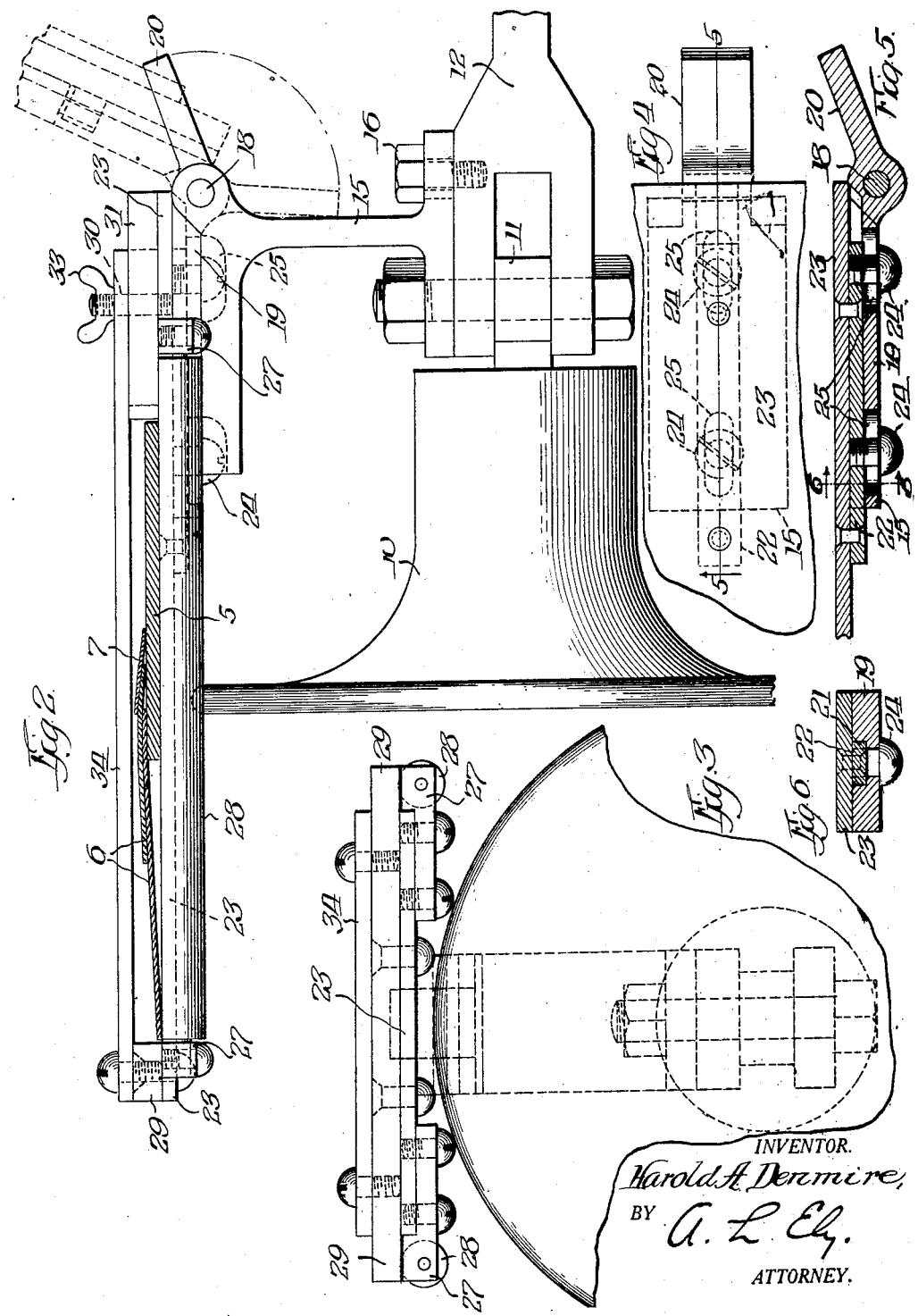

Patented Oct. 25, 1927.

1,647,104

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

TIRE-BUILDING MACHINE.

Application filed July 11, 1924. Serial No. 725,396.

This invention relates to the art of tire building and particularly to a machine for the application of the various elements of the tire casing to the carcass, especially to a device for applying certain finishing elements to the carcass.

In the building of a tire one of the last operations is the application of the various finishing elements to the carcass of the tire, which elements are comprised in the side-wall and one or more strips of fabric which are applied to the bead of the tire and are known as "chafer strips." Heretofore the application of these finishing elements has been done by hand. It is the purpose of this invention to devise a mechanism whereby they can be applied by the tire machine.

In the drawings accompanying this application is shown one form or embodiment of the invention, the apparatus shown being subject to modification and changes within the scope of the invention.

In the drawings:

Figure 1 is a plan view of the improved device, a core being shown in section with the partially finished tire thereon;

Figure 2 is a side elevation;

Figure 3 is a front view;

Figure 4 is a detail of the adjustment device;

Figure 5 is a section on the line 5—5 of Figure 4; and

Figure 6 is a section on the line 6—6 of Figure 5.

A tire building core of the usual construction is indicated by the numeral 1 and the carcass of the tire by the numeral 2. The carcass is composed of a plurality of layers of rubberized fabric, in the inner edges of which are located the beads of the tire, one of the beads being indicated by the numeral 3. The tread strip is indicated at 4.

The device of the present invention is intended to apply the side-wall and chafer strip about the sides and around the beads of the casing. Of these elements, the side-wall is indicated by the numeral 5 and the chafer strips (two being shown in the present instance) by the numeral 6. A gum strip 7 may be employed about the outer edge of the chafer strip.

The device of the present invention is designed to be associated with and function as a part of the usual tire making machine. The machine comprises the usual stitching or spinning roller 10 which is rotatably mounted on a swivel 11 carried in the forked end of the radially movable stitcher arm 12.

The device for delivering the finishing strips to the core is carried upon the arm which supports the stitcher so that the material will be delivered to the carcass in proper relation to the stitcher. After the material is attached to the carcass, it can be shaped about the side-walls and beads by the stitcher.

The guiding and applying device is mounted on a bracket 15 which is pivotally secured upon the pivot 11 and held in any desired angular position by means of a bolt 16 which passes through an arc-shaped slot 17 in the base of the bracket. It has been found that it is desirable to provide for angular adjustment of the bracket as a unit so as to be able to vary the angle at which the material is fed to the core, this adjustment permitting the material to be placed in position without wrinkling.

To the bracket 15 is pivoted at 18 an arm 19 which rests upon the horizontal surface of the bracket and is supported thereby when the device is in use. When not in use, the whole device may be swung backwardly but out of the way of the stitcher, a stop 20 being provided for this purpose.

The upper surface of the arm 19 is grooved, as shown at 21, and in this groove is received a rib 22 which is attached to a plate 23 and upon which the plate is adjustable toward and from the center of the core. Screws 24 are attached to the rib and project through a slot in the arm 19 so as to secure the adjustable plate in position, the heads of the screws being received in slots 25 in the bracket 15 and serving to prevent tilting of the arm about its axis. The radial adjustment of the plate is for the purpose of locating it properly with respect to the inner circumference of the tire bead.

The plate 23 extends out over the stitcher 10 and occupies the position relative to the core shown in Figure 1. On each side of the plate and supported in brackets 27 is carried a roller 28 over which the finishing material can pass. At the outer end of the plate 23 is secured a guide bar 29 and to the inner end of the plate is secured, by means of bolts 30, an adjustable guide bar 31. The bar 31 is adjustable by means of slots 32 through which the bolts 30 pass, wing nuts 33 securing the bar 31 in position. A cover plate 34 is secured to the bar 29 and projects over the bar 31, serving to maintain the finishing material in flat condition upon the plate.

The apparatus is used in the following manner. When the tire building machine is being operated for the building of a tire carcass, the plate is swung backwardly so as to be out of the way. When the carcass is in condition to receive the finishing strips, the stitcher carrying arm 12 is moved to its proper position with respect to the core and the plate is then swung downwardly to horizontal position. The finishing strip, illustrated in section in Figure 2, is threaded through the device and its forward end brought down and attached to the core by the stitcher 10. The core is then started in rotation which serves to draw the finishing material through the device and attach it to the core by the pressure of the stitcher, the strip of material assuming approximately the position shown in Figure 1. When a complete revolution of the core has been made, the material is cut off and a splice made, whereupon the plate is swung backwardly, the end of the material being left in the device if desired. The core is now started in rotation and the stitcher caused to traverse the side of the core by the usual mechanism, shaping and applying the side-wall and chafer about the carcass of the tire. The various adjustments which have been described are provided to compensate for the differing factors in the building of the tire. The angular positioning of the whole device relative to the core is useful in obtaining a smooth application of the covering material. The radial adjustment of the plate by the screws 24 will accommodate varying bead diameters and the adjustment of the plate 31 will compensate for differing widths of the finishing material.

It will be observed that by the device shown and described, there is provided a simple and accurate attachment for a tire machine by which the finishing elements may be applied and shaped into position upon the carcass. The device is useful for the purposes specified and the invention is capable of embodiment in different forms than that shown herein.

While the device has been described as applied to one side only of the core, it will be evident that in practice one is provided for each side of the core to enable the operation of finishing to be performed on both sides simultaneously,

What is claimed is:

1. A combined tire making and finishing machine comprising a rotatable core, an arm adjacent the core, a spinning roller upon the arm, a bracket carried by the arm and angularly adjustable thereon, a plate pivoted to the arm and movable toward and from a horizontal position over the spinning roller, and guiding means on the plate for directing finishing material between the core and the spinning roller.

2. A combined tire making and finishing machine comprising a rotatable core, an arm adjacent the core, a spinning roller upon the arm, a bracket carried by the arm, a second arm pivoted on the bracket and movable toward and from a horizontal position over the roller, a plate adjustable longitudinally on the second arm, and guiding means for finishing material carried by the plate and operating to direct finishing material between the core and the spinning roller.

HAROLD A. DENMIRE.